United States Patent
Bleechmore et al.

(10) Patent No.: US 9,784,171 B2
(45) Date of Patent: Oct. 10, 2017

(54) AIR COOLING SYSTEM FOR AN UNMANNED AERIAL VEHICLE

(75) Inventors: Callan Murray Bleechmore, Swanbourne (AU); John Howard Tubb, Bedfordale (AU); Donald Andrew Railton, Duncraig (AU); Stephen John Karay, Scarborough (AU); Pouria Mehrani, Darch (AU)

(73) Assignee: Orbital Australia Pty Limited (AU)

(*) Notice: Subject to any disclaimer, the term of this patent is extended or adjusted under 35 U.S.C. 154(b) by 786 days.

(21) Appl. No.: 14/127,163

(22) PCT Filed: Jun. 29, 2012

(86) PCT No.: PCT/AU2012/000782
§ 371 (c)(1),
(2), (4) Date: Mar. 24, 2014

(87) PCT Pub. No.: WO2013/000036
PCT Pub. Date: Jan. 3, 2013

(65) Prior Publication Data
US 2014/0220873 A1    Aug. 7, 2014

(30) Foreign Application Priority Data
Jun. 30, 2011 (AU) ................ 2011902586

(51) Int. Cl.
*F01P 1/06* (2006.01)
*B64D 33/08* (2006.01)
(Continued)

(52) U.S. Cl.
CPC ............... *F01P 1/06* (2013.01); *B64D 33/08* (2013.01); *B64C 39/024* (2013.01);
(Continued)

(58) Field of Classification Search
CPC ... B64C 11/00; B64C 39/024; B64C 2201/00; B64C 2201/044; B64C 2201/141;
(Continued)

(56) References Cited

U.S. PATENT DOCUMENTS

| | | | |
|---|---|---|---|
| 1,944,878 A | * | 1/1934 | Diehl ................ B64D 33/08 123/41.7 |
| 2,272,626 A | | 2/1942 | Starke |

(Continued)

OTHER PUBLICATIONS

Insitu ScanEagle UAV cutaway, retrieved from Flightglobal/Airspace Images at http://www.flightglobal.com/ on Jan. 10, 2014 (2 pages).
(Continued)

*Primary Examiner* — Steven B McAllister
*Assistant Examiner* — Ko-Wei Lin

(57) ABSTRACT

An air cooling system for an unmanned aerial vehicle including a propeller (14) driven by an engine (12) has at least one cooling air duct (22) to direct cooling air to cool a vehicle component e.g. a cylinder head. The duct has at least one air inlet and at least one air outlet. Operation of the propeller causes a pressure differential between the air outlet (24,124) and the air inlet (23,123) which draws air through said cooling air duct (22). A cowling (16) can cover at least part of the engine, and can form a plenum and have the supply of cooling air through a front face aperture (164) or side walls (17) of the engine cowl (16).

19 Claims, 11 Drawing Sheets

(51) Int. Cl.
*B64C 39/02* (2006.01)
*F01P 1/02* (2006.01)

(52) U.S. Cl.
CPC ........... *B64C 2201/044* (2013.01); *F01P 1/02* (2013.01); *F01P 2050/20* (2013.01)

(58) Field of Classification Search
CPC ........ B64C 2201/162; B64C 2201/165; B64D 13/006; F01P 1/02; F01P 1/06; F01P 2050/20
USPC ...... 123/41.56, 41.7; 244/53 R, 53 B, 57, 55
See application file for complete search history.

(56) References Cited

U.S. PATENT DOCUMENTS

| | | | |
|---|---|---|---|
| 2,426,635 A * | 9/1947 | Mercier | ................. B64C 11/00 123/41.56 |
| 6,270,038 B1 | 8/2001 | Cycon et al. | |
| 2007/0023582 A1 | 2/2007 | Steele et al. | |

OTHER PUBLICATIONS

International Search Report from the Australian Patent Office for International Application No. PCT/AU2012/000782 mailed Aug. 29, 2012.
International Search Report from the Australian Patent Office for International Application No. PCT/AU2012/000782 dated Aug. 29, 2012.
International Preliminary Report on Patentability from the Australian Patent Office for International Application PCT/AU2012/000782 dated Sep. 13, 2013.

\* cited by examiner

AIR COOLING SYSTEM FOR AN UNMANNED AERIAL VEHICLE

CROSS-REFERENCE TO RELATED APPLICATIONS

This application is a U.S. national stage filing under 35 U.S.C. § 371 of International Application No. PCT/AU2012/000782, entitled "An Air Cooling System for an Unmanned Aerial Vehicle," filed Jun. 29, 2012, which claims priority to Australian Provisional Application No. 2011902586, filed on Jun. 30, 2011.

TECHNICAL FIELD

This invention relates to an air cooling system for an unmanned aerial vehicle ("UAV").

BACKGROUND

UAVs have increasing application for defence and security applications being used for many purposes including surveillance and harassment. However, UAVs may be used for a range of other purposes in civil applications including surveying and mineral exploration.

Various designs of UAV are in current use. Some are of ducted fan type in which a rotary fan, propeller or prop assembly, driven by an engine, is enclosed within a shroud. Others are of fixed wing type or helicopter type and still others are of hybrid type such as described in U.S. Pat. No. 6,270,038 assigned to Sikorsky Aircraft Corporation.

UAV engines like other engines require a cooling system to ensure satisfactory engine operation and to prevent overheating and potential failure associated therewith.

Air cooling of UAV engines is preferred, where possible, since this reduces the overall weight and failure modes of the engine, noting that liquid cooled engines, such as water cooled engines, require liquid coolant circulation systems including liquid coolant tanks or reservoirs, pumps, pipework and so on, all of which have associated mass and failure modes. Components such as pumps, and liquid coolant tanks or reservoirs—as well as liquid coolant inventory (e.g. water inventory) also add an associated cost to an overall UAV engine package. Accordingly, UAVs are optimally as lightweight as possible. Air cooling avoids the need for a liquid coolant circulation system, with its associated weight, failure modes and cost, and assists in maximizing payload of important equipment such as surveillance equipment on-board the UAV.

Whilst many UAVs take off from the ground in the manner of conventional aircraft with landing wheels, smaller UAVs do not typically take off in the manner of conventional aircraft. Rather, smaller UAVs are launched, either by a catapult or similar launch device or, possibly, by hand for lighter weight craft. However, prior to launch of a UAV, it is common for the engine, and corresponding prop assembly, to be started up ready for flight. At this stage, in which the engine may be kept running at up to full engine speed and power output for some time, heat builds up in the engine and particularly in the cylinder head of the engine. This can be problematic even at idle conditions, let alone at wide open throttle conditions.

As air cooled engines rely on convective heat transfer to provide cooling and convective heat transfer is promoted by the forced convection achieved by increasing air velocity achieved as UAV air speed increases after launch, any convective heat transfer from the engine is unforced and obviously not optimized prior to launch. Prior to launch, UAV air speed is zero and ambient airflows do not usually traverse the hotter parts of the engine surface, these parts typically being enclosed within a shroud or cowl which, though provided with ducting for cooling air, only supply this when sufficient UAV air speed is achieved. Whilst operation through rotation of the prop may cause some airflow over the engine, this will be minimal for the same reason. In such circumstances, engine overheating can become a real problem creating significant risk of engine seizure and failure.

It is an object of the present invention to provide an air cooling system for an unmanned aerial vehicle (UAV) which is operable prior to launch and at other times during operation of the UAV.

SUMMARY OF THE INVENTION

With this object in view, the present invention provides an air cooling system for an unmanned aerial vehicle including a propeller driven by an engine, said air cooling system comprising at least one cooling air duct for directing cooling air for a vehicle component, said at least one cooling air duct having at least one air inlet and at least one air outlet for the passage of air after a cooling duty, wherein operation of said propeller causes a pressure differential between the air outlet and the air inlet which draws air through said cooling air duct.

The pressure differential, and so the rate and velocity of air flow through the cooling air duct, increases as engine speed and propeller speed (of rotation) increases. The pressure differential decreases as propeller speed decreases, notably during descent. When the UAV is in flight, air speed of the vehicle may also induce air flow through the air cooling system. However, air speed is not required for the cooling system to operate. Airflow through the air cooling system may therefore not solely be dictated by operation of the propeller. As such, air flow could, in certain circumstances, be high enough to lead to overcooling of the engine, and so the air cooling system is advantageously configured to avoid such issue. Some configurations of the air cooling system are described below.

The propeller (or 'prop') conveniently forms part of a pusher prop assembly located aft of a fuselage of the UAV. Pusher prop assemblies provide forward thrust along a longitudinal axis of the UAV and are desirable for reducing drag on the UAV during flight. Pusher prop assemblies are also beneficial where centre of gravity considerations are important for certain UAVs, particularly those where the engine is the single heaviest component of the UAV and requires to be placed close to the centre of the UAV. The pusher prop assembly includes a propeller drive shaft engaged with the engine. While such prop has a horizontal axis, the air supply system can also be used with prop designs of vertical axis or inclined axis type. It follows that the prop need not form part of a pusher prop assembly. For example, the present invention may equally be embodied as part of tractor prop or other type of prop assembly where the prop causes air to be drawn through the cooling air duct through a rear air inlet of the air cooling system. Furthermore, UAVs having a plurality of props or rotors are known and commonly used. It is to be understood that such UAVs may also include the present air cooling system.

The air is conveniently supplied, during operation of the prop, through a cooling air duct for cooling the engine of the unmanned aerial vehicle (UAV), air cooled engines being advantageous from perspectives of minimizing weight, failure modes and cost of the aircraft. A single cooling air duct may be provided for directing air at a selected portion of the engine for cooling. However, the cooling air duct may have plural portions, or plural cooling air ducts may be provided, to direct cooling air wherever required for the engine. Engine cooling air must be supplied in a controlled manner because, whilst engine overheating would be a real risk prior to launch, the opposite problem of overcooling can impact conventional UAV engines during descent and other potential modes of engine operation. That is, overcooling creates its own engine operability problems.

The engine is advantageously at least partially enclosed by an engine cooling shroud or cowl provided with one or more apertures for intake and exhaust of air for the cooling system. The engine shroud or cowl may also be conveniently arranged to help reduce drag for the UAV. The cooling air duct is conveniently designed with reference to the engine shroud or cowl design to achieve desired cooling air flow through the air cooling system for the engine.

The cooling air duct conveniently has a first cooling air duct portion extending through a plenum portion of the engine cowl for supplying cooling air for circulation around the cylinder head, typically the hottest part of the engine. A cylinder head portion of the engine shroud or cowl surrounds the cylinder head. To this end, the first cooling air duct portion conveniently communicates with a cylinder head cooling air duct portion extending between an inner surface of the cylinder head portion of the engine cowl and the cylinder head. This cylinder head cooling air duct portion directs cooling air around the cylinder head.

A convenient location for an air outlet of the cooling air duct is on the engine shroud or cowl in close proximity to the propeller or prop. Such location, conveniently adjacent a radially inner part of the prop, allows the prop to generate a greater pressure driving force between the air inlet and the air outlet to draw air through the cooling air duct. Location of the air inlet and air outlet should however minimise interference with prop operation. In particular, the air inlet and air outlet should minimise any disruption of airflow to the prop which operates best in non-turbulent airflow. To avoid or at least minimise disruption of airflow to the prop, the engine cowl is provided with as aerodynamic and streamlined a shape as possible.

The cylinder head, or a portion thereof, is conveniently provided with a plurality of cooling fins which assist in convective heat transfer away from the cylinder head. In such case, the cylinder head cooling air duct portion of the cooling air duct is arranged to direct air towards the cooling fins of the cylinder head. The cooling air duct may also direct cooling air to any other part of the engine where cooling fins are provided, for example the cylinder barrel. The cooling air duct is preferably closely coupled with the cooling fins, with its cylinder head/engine block cooling portion extending outward of, and surrounding, the cooling fins, forming a cooling air gallery between an inner surface of the engine cowl and the cylinder head. Dimensions of the cooling air gallery may be selected to optimise cooling air flow and velocity through the cooling air gallery and convective heat transfer. As air flow is created by operation of the prop, such convective heat transfer is forced.

The engine cowl extends in a direction from the prop towards the front of the UAV and has side walls connected by an upper surface, the side walls possibly being spaced by a front face. The air inlet(s) could be provided towards such front face of the engine cowl being supplied with air through an aperture formed in the front face. Such aperture may occupy almost the entire front face of the engine cowl. Air is then caused to flow through the aperture, into the plenum portion of the engine cowl and through to the air inlet of the cooling air duct. Such airflow is more particularly to the first cooling air duct portion which extends through the plenum portion. The air inlet faces in the same direction as the front face aperture of the engine cowl but it has significantly less cross-sectional area. Nevertheless, a high rate of air flow into the cooling system is possible.

The cooling air duct may have a first portion extending through the engine cowl at the level of the cylinder head and a second portion, located to direct air towards cooling fins of the cylinder head, where provided, as described above. Supply of cooling air through the front face of the engine cowl is convenient. However, in a condition where there is air speed, but reduced prop load, such as during descent of the UAV, airflow through the cooling air duct may be high enough to cause overcooling of the engine in certain operating environments.

Alternatively, and in an arrangement which reduces the risk of overcooling, one or both side walls of the engine cowl may be provided with apertures for supplying air to the cooling air duct. No air inlet is provided at a front face of the engine cowl in this case. Indeed, the side walls of the engine cowl may converge, curving towards each other to join at its front. This has the advantage of forming a further optimized aerodynamic or streamlined shape for the engine cowl.

The side wall apertures of the engine cowl provide sufficient air supply for the air cooling system and have another significant benefit. The side wall aperture location, extending in a direction of air flow toward the prop, presents lesser cross-sectional or flow area in a direction towards the front of the UAV. Such location and flow area reduces air speed induced air flow into the air cooling system, in comparison with a front face aperture design, and reduces sensitivity of the air cooling system to air speed induced air intake to the air cooling system. Consequently, the side aperture design presents less risk of engine overcooling where specific environmental conditions are to be taken account of.

The side wall apertures open into the plenum portion of the engine cowl and allow air supply to a cooling air duct extending through, and having air inlet located within, the plenum. The cooling air duct may open in a direction perpendicular to the direction in which a side air inlet of the engine cowl faces, this opening also advantageously being in line with an edge, being a rearward edge in the case of a pusher prop assembly, of a side aperture; or shielded by an engine cowl side wall. Thus, through effective baffling of the air inlet, air is caused to change direction—effectively at right angles to its direction of entry to the plenum portion—before being admitted to the cooling air duct. This results in sufficient though reduced cooling air flow and velocity into the cooling air duct in comparison with the front face option described above, and less risk of engine overcooling.

Number, shape, configuration, flow area and actual location of the side or front apertures of the engine cowl may be selected or tuned to minimise risks of engine overheating and overcooling.

While the air supply system has so far been described with reference to air used for cooling the UAV engine, cooling air could be used for other purposes. For example, air could be supplied for cooling of electronic equipment on board the UAV.

The air supply system of the present invention is applicable to a range of UAVs driven by a prop assembly and a range of possible engine types. A preferred engine type is fuel injected, more preferably a direct fuel injected engine type whether spark ignited or compression ignited, two stroke or four stroke. The UAV can operate on a range of fuel types including diesel, gasoline, kerosene type fuel (including those fuel types preferred by the US military) and gaseous fuel.

The air cooling system may be used to reduce overheating prior to launch and overcooling on descent of a UAV. The air supply system is also beneficially used for engine cooling at other times during UAV operation. At the same time, the above described design of air cooling system may provide benefits for noise attenuation, reduction of UAV operating noise being an important object in many cases.

Benefits of the present invention include that no additional cooling for the engine is required during operation, either when the UAV is in flight or when on the ground with the engine running and propeller spinning. When on the ground, the air duct arrangement of the present invention is sufficient to provide the only cooling required for the air cooled engine. It is known that other UAV engines require an air blower arrangement carried by or associated with the launch device/vehicle to deliver air into the inlet of the cowling around the engine.

One or more embodiments of the present invention provide an air inlet arrangement which prevents overcooling during UAV flight, including under certain conditions such as low engine load and during descent. Front and side air inlets or side inlets only help cooling by controlling and/or reducing the flow of cooling air to the cylinder head and/or engine.

Disruption to airflow in front of the propeller in a pusher prop assembly is reduced by virtue of the configuration of the engine cooling shroud or cowling. The size, shape and/or direction of the outlet adjacent the prop can be arranged to control airflow.

One or more embodiments includes the outlet adjacent the propeller arranged and located to maximise the draw of cooling air through the shroud or cowling, such as through the distance from the propeller itself and the axis of propeller rotation, while minimising any effects on propeller efficiency.

BRIEF DESCRIPTION OF THE DRAWINGS

The air cooling system of the present invention may be more fully understood from the following description of preferred embodiments thereof made with reference to the accompanying drawings in which:

FIG. 2b shows a cutaway view of the arrangement shown in FIGS. 1 and 2a.

FIG. 6b shows a cutaway view of the arrangement shown in FIGS. 5 and 6a.

DESCRIPTION OF PREFERRED EMBODIMENTS

Figure 1:
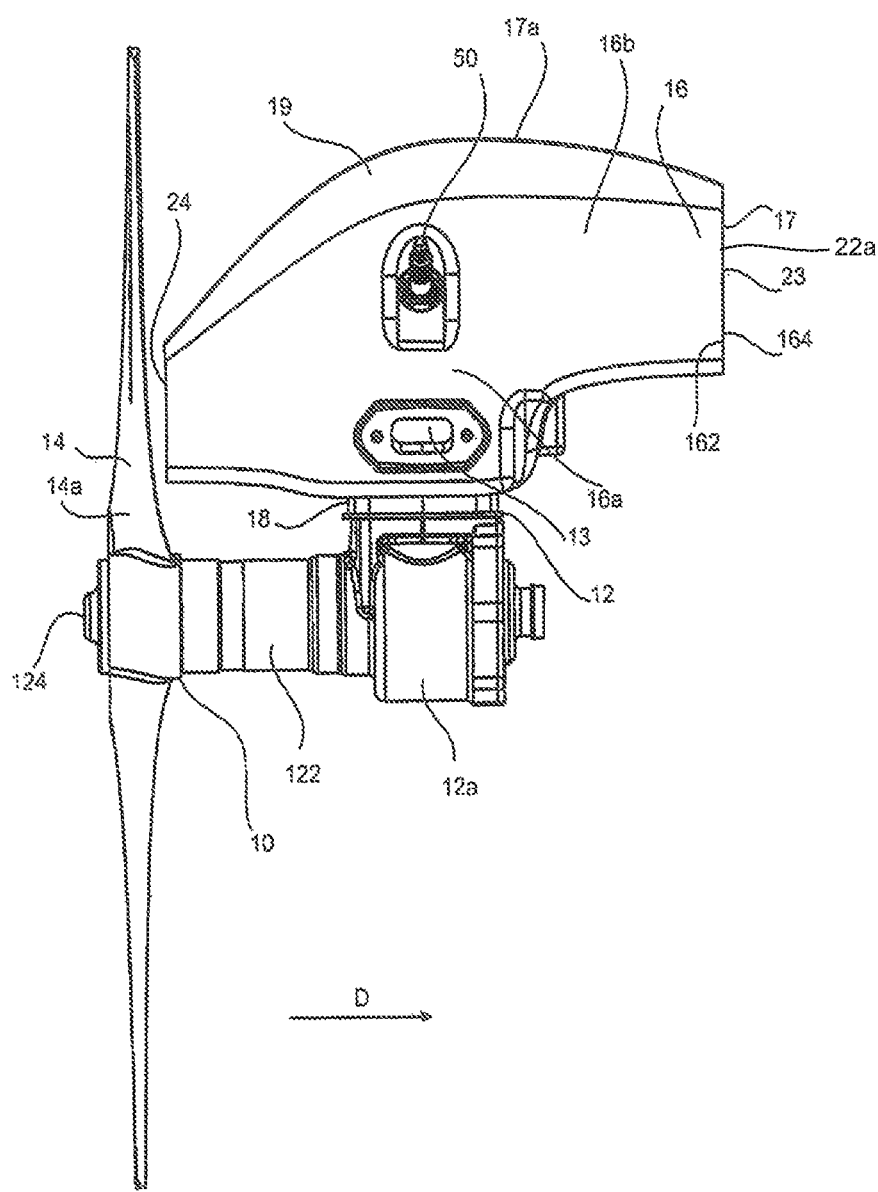
FIG. 1 is a side view of a pusher prop assembly and its associated engine incorporating a first embodiment of air supply system of the present invention.

Referring first and generally to FIGS. 1 to 8, an unmanned aerial vehicle (UAV) (not shown), e.g. to be launched by a catapult launcher, includes a pusher prop assembly 10 driven by an engine 12, a lower part 12a of which is visible. Lower part 12a of engine 12 includes a casing 122 for a drive shaft 124 engaging engine 12 with prop 14 of conventional design.

The engine 12 is a two stroke fuel injected engine provided with a dual fluid fuel injection system as supplied by Orbital Engine Corporation Ltd under the trade mark "FlexDI". Fuel is ignited by spark plug 50 and exhaust gases from combustion are exhausted through exhaust port 13.

Figure 9:
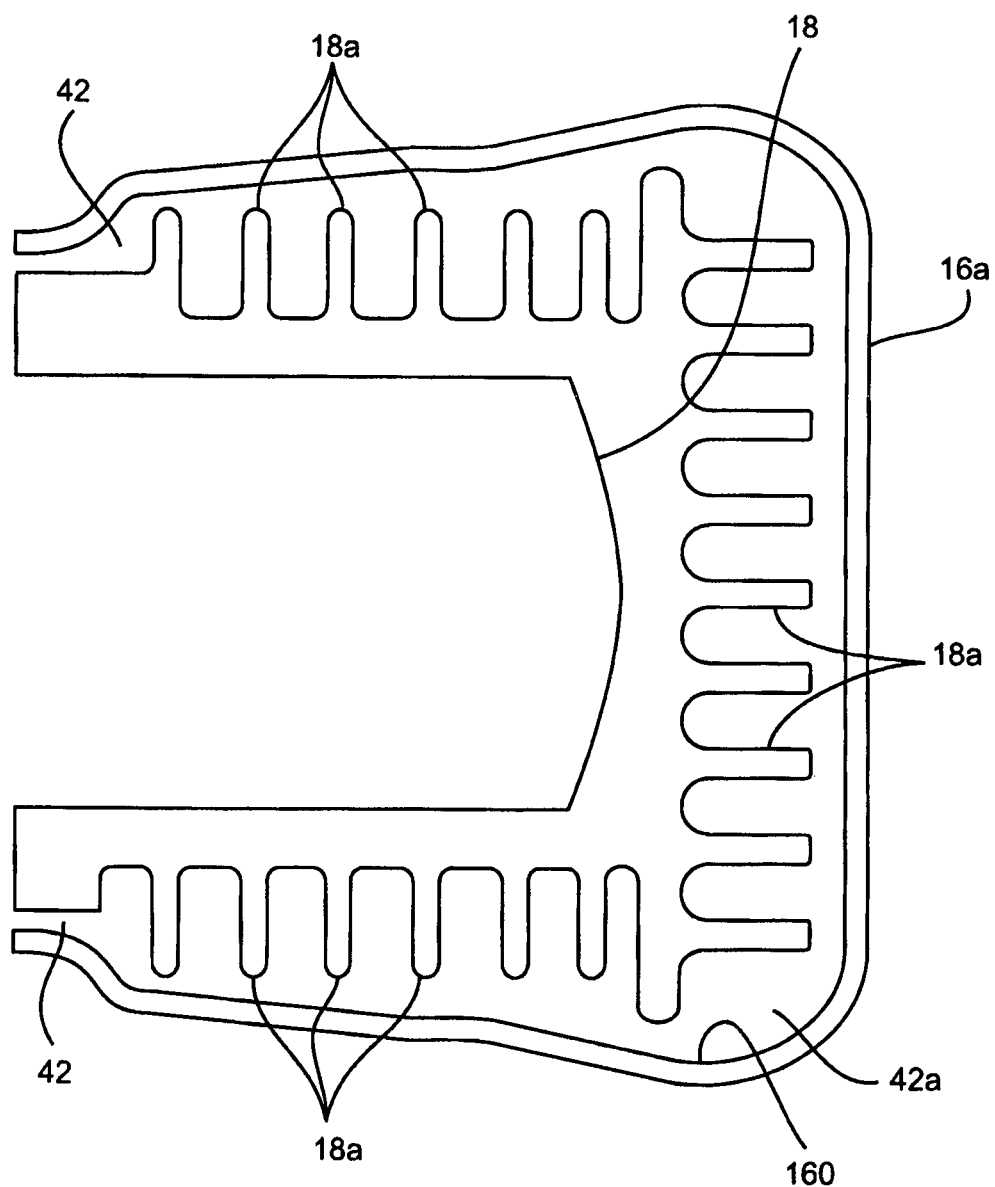
FIG. 9 is a schematic cross-sectional view of a portion of an engine cowl as shown in FIGS. 1 to 8.

The upper part of engine 12 is partially enclosed by an engine cowl 16, the engine cooling cowl 16 being arranged in close alignment with the cylinder head 18 (as shown in FIG. 9). Engine cowl 16 comprises a cylinder head portion 16a surrounding the cylinder head 18; and a plenum portion 16b, defined by side walls 17 connected by an upper cowl surface 17a. The upper cowl surface 17a is curved to form an aerodynamic or streamlined shape, this shape avoiding or at least minimizing disruption to airflow toward the prop 14 and helping to minimize drag for the UAV. The engine, cowl and propeller are shown in a pusher prop arrangement with the engine forward of the propeller for a direction of travel D.

The engine 12 is cooled by an air cooling air system including a cooling air duct 22 which has a first cooling air duct portion 22a extending through the plenum portion 16b of engine cowl 16 for circulating air around the engine 12 for cooling same through forced convective heat transfer. The first cooling air duct portion 22a communicates with a cylinder head cooling duct portion 42 arranged for directing a flow of cooling air around the cylinder head 18, typically the hottest part of engine 12.

The air cooling system can be the only cooling system for the engine i.e. a liquid cooling system need not be required.

The first cooling air duct portion 22a includes an air inlet 23, located within the plenum portion 16b, for admitting air supplied through one or more aperture(s) located in engine cowl 16. Design options for the engine cowl apertures are described below. Air outlet 24, of selected area, is provided at the rear of engine cowl 16 for exhausting cooling air after engine 12 cooling duty. Air outlet 24 is located at the rear of the engine cowl 16 adjacent a radially inner part 14a of the prop 14. Such an adjacent air outlet 24 location allows the prop 14 to generate a greater pressure differential, i.e. pressure driving force, between air outlet 24 and air inlet 23 to draw air through the cooling air duct 22. In this respect, operation through rotation of prop 14 generates suction and draws air through the cooling air duct 22 for use in a cooling duty for the UAV. The pressure differential, and so the rate and velocity of airflow through the cooling air duct 22, increases as prop speed increases. As prop 14 is run prior to UAV launch, potentially at full engine speed and load, the air cooling system supplies cooling air to the engine 12 during this time.

Location of the air inlet 23 and air outlet 24 is selected so as to minimise any effect on the operation of prop 14. In particular, location of air inlet 23 and air outlet 24 are selected to not significantly disrupt airflow to the prop 14 which operates best in non-turbulent non-disrupted airflow.

As shown in FIG. 9, cylinder head cooling duct portion 42 extends between an inner surface 160 of the cylinder head portion 16a of engine cowl 16 and the cylinder head 18 for directing cooling air around the cylinder head 18. Cylinder head 18 is provided with a plurality of cooling fins 18a which assist in convective heat transfer away from the cylinder head 18. To that end, the cylinder head cooling duct portion 42 is closely associated with the cooling fins 18a, and engine cowl 16 is arranged a small distance from the cooling fins 18a (or in certain applications can be touching the cooling fins 18a) to form a cooling air gallery 42a between the inner surface 160 of the cylinder head portion 16a and cooling fins 18a. Dimensions of the cooling air gallery 42a are selected to optimize cooling air flow and velocity through the cooling air gallery 42a and convective heat transfer away from cylinder head 18 and its associated cooling fins. As cooling air is drawn through the cylinder head cooling duct portion 42 by operation of prop 14, it will be understood that the convective heat transfer is forced.

Referring specifically now to FIGS. 1 to 4, engine cowl 16 may include a front face 162 located between side walls 17 and below upper cowl surface 17a. The cooling air duct 22 extends within plenum portion 16b of the engine cowl 16, at the level of the cylinder head 18, towards this front face 162. Air inlet 23 of cooling air duct 22 is also located within the plenum portion 16b. Air is supplied to the air inlet 23 through aperture 164 formed in the front face 1162. Such aperture 164, of generally polygonal shape, occupies almost the entire front face 162 of the engine cowl 16.

Figure 2A:
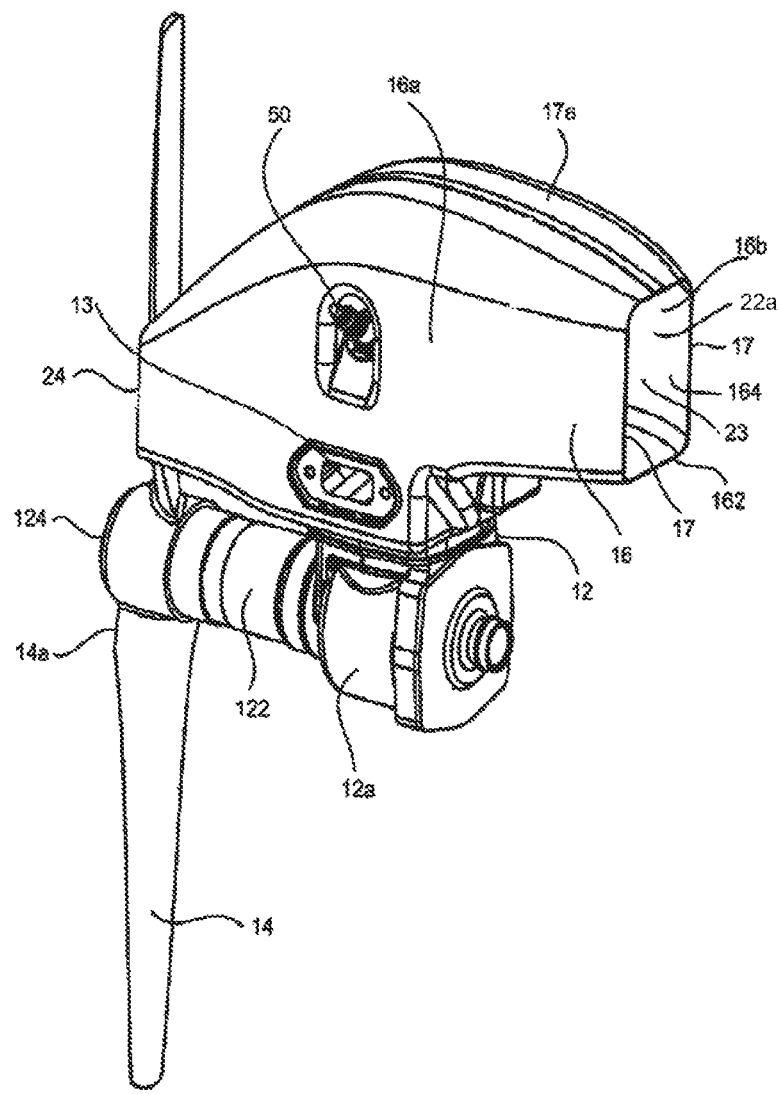
FIG. 2a is a rear isometric view of the pusher prop assembly and associated engine of FIG. 1.
Figure 2B:
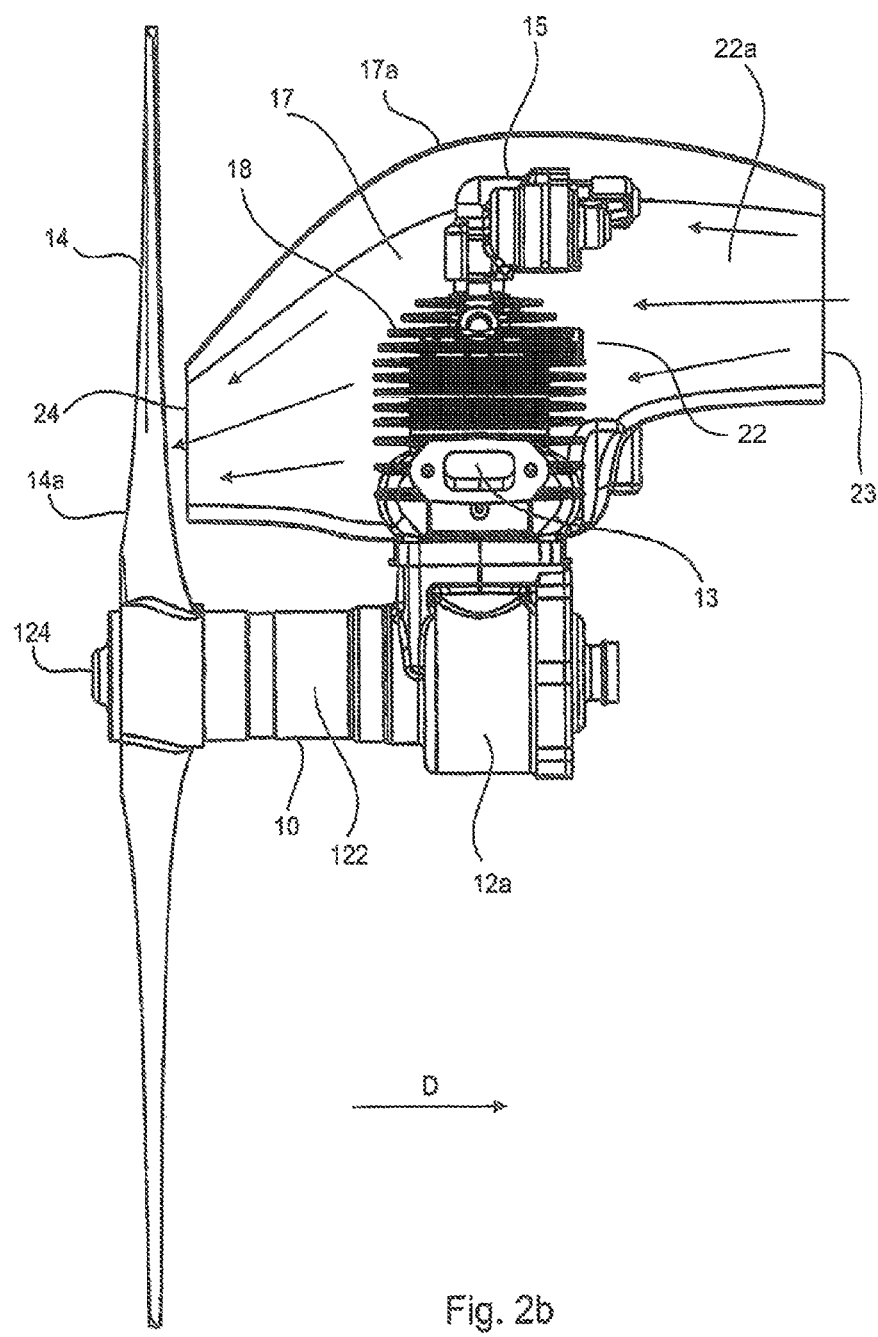
Figure 3:
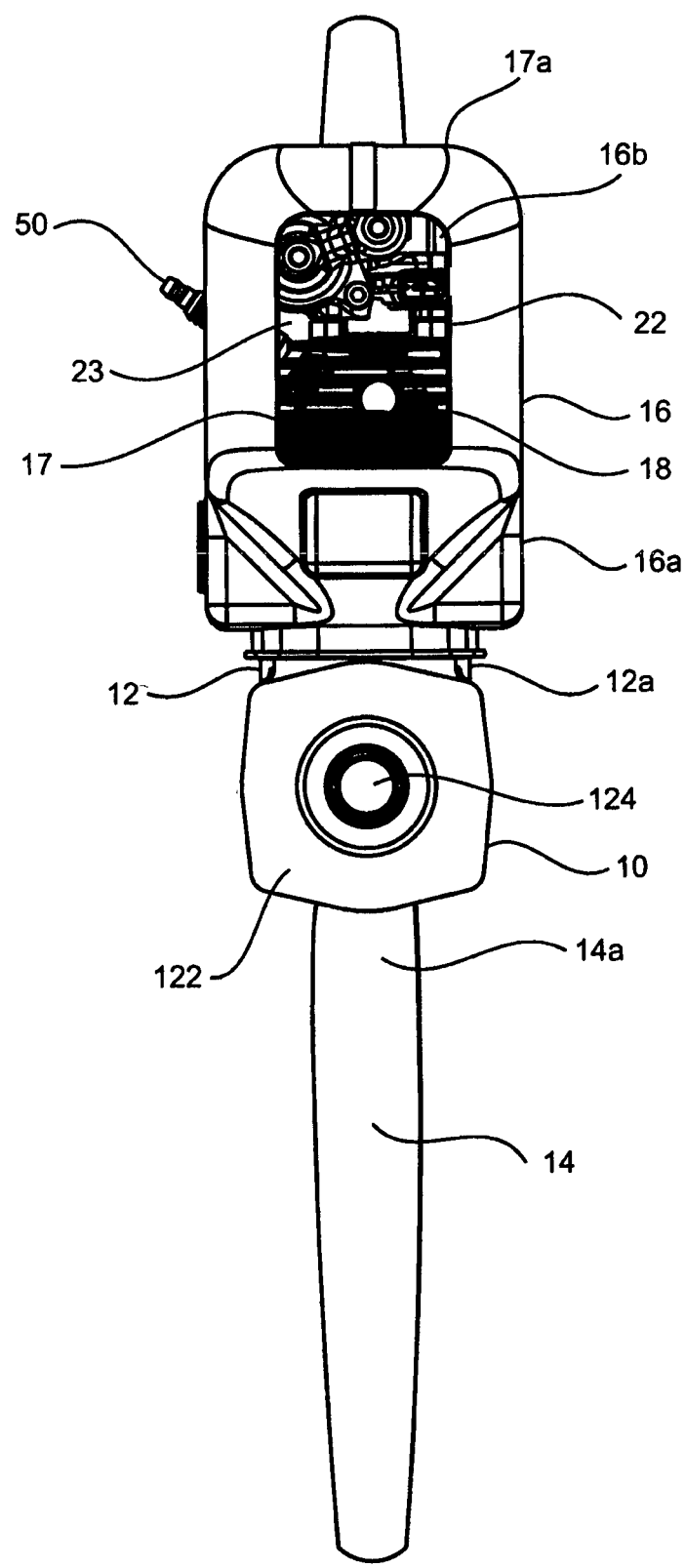
FIG. 3 is a rear view of the pusher prop assembly and associated engine of FIGS. 1 and 2.
Figure 4:
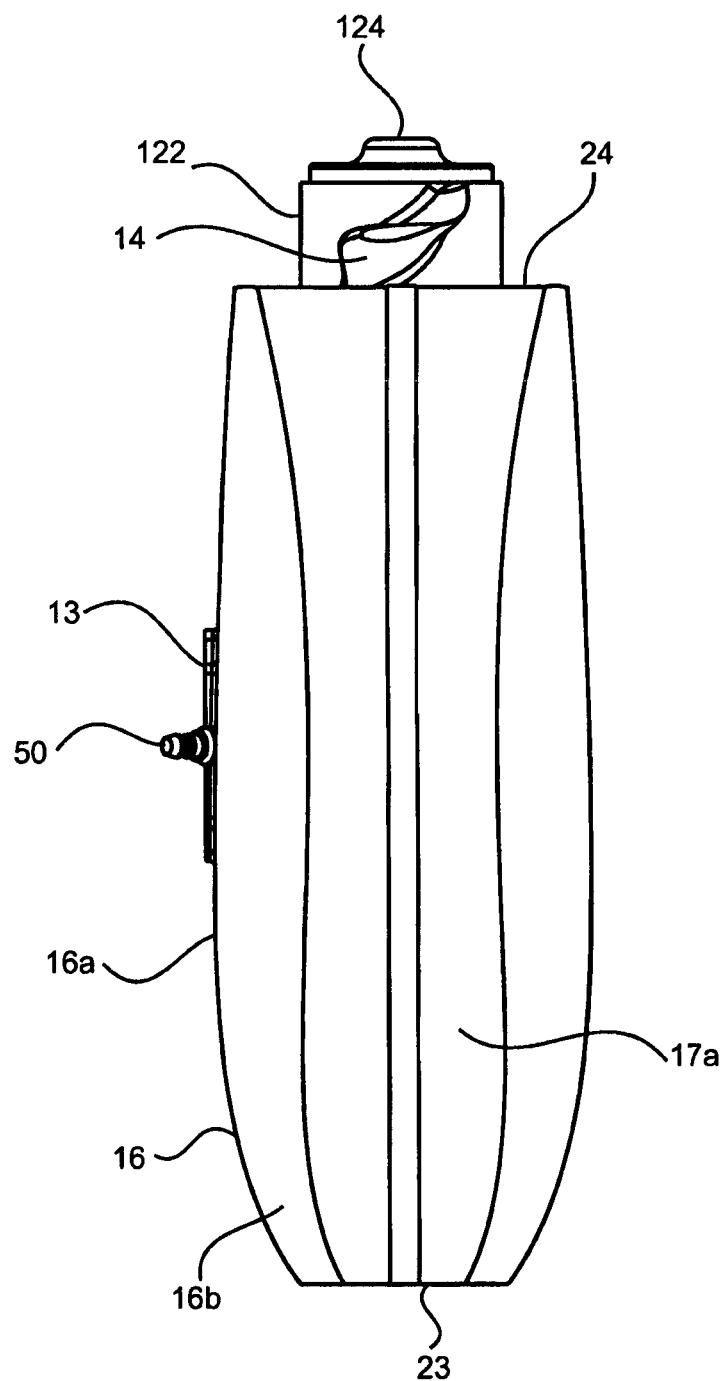
FIG. 4 is a top view of the pusher prop assembly and associated engine of FIGS. 1 to 3.
Figure 5:
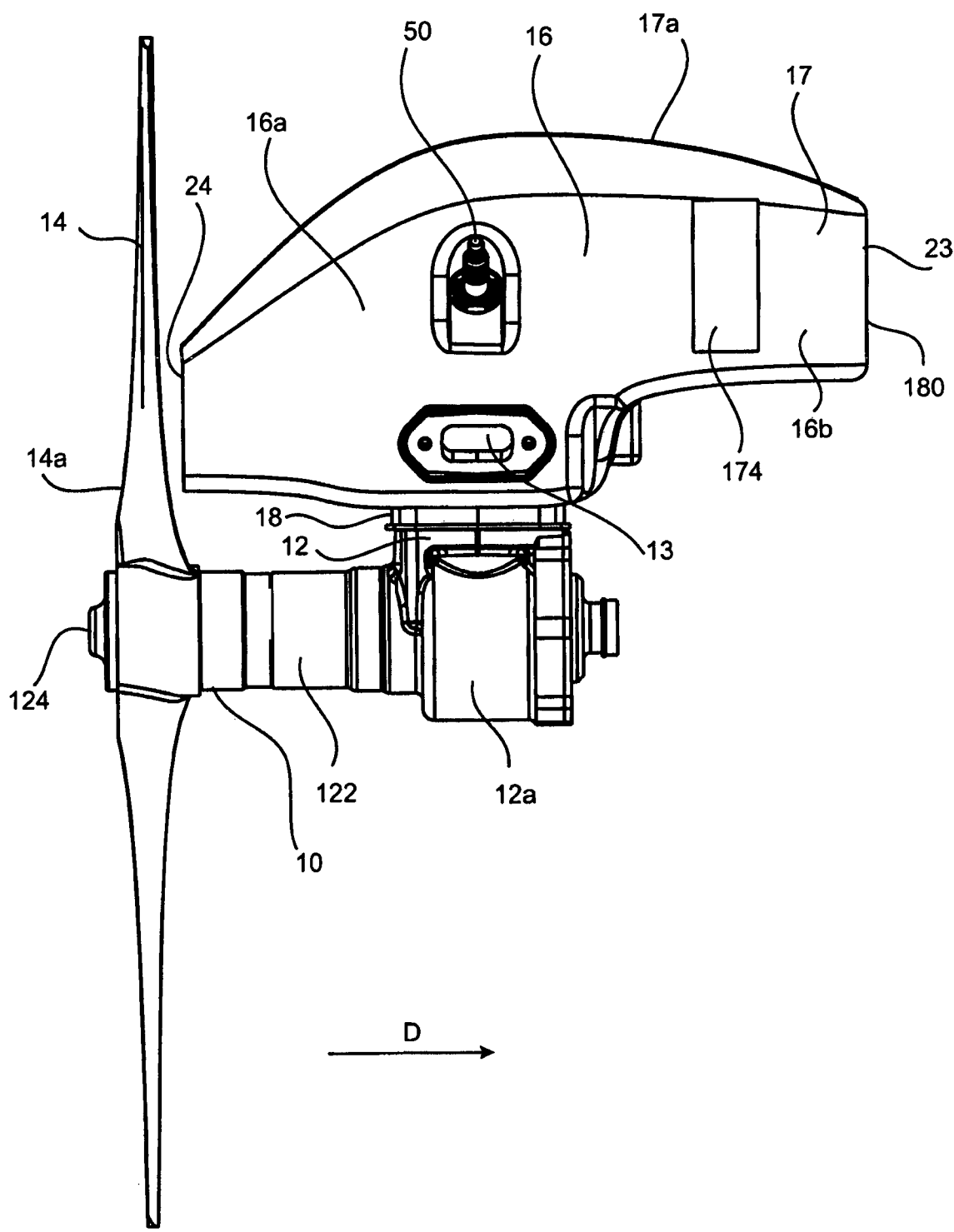
FIG. 5 is a side view of a pusher prop assembly and its associated engine incorporating a second embodiment of air supply system of the present invention.
Figure 6A:
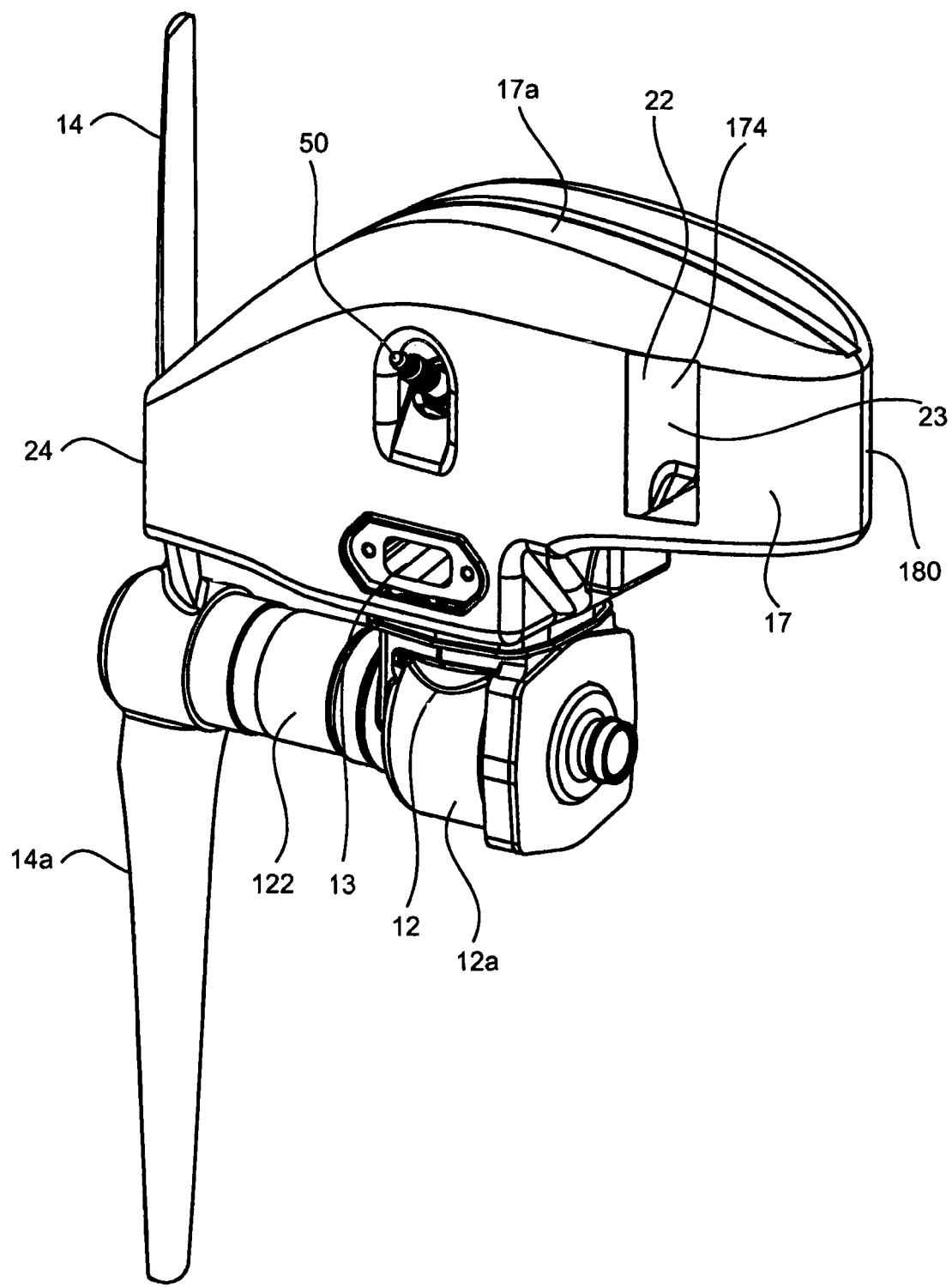
FIG. 6a is a rear isometric view of the pusher prop assembly and associated engine of FIG. 5.
Figure 6B:
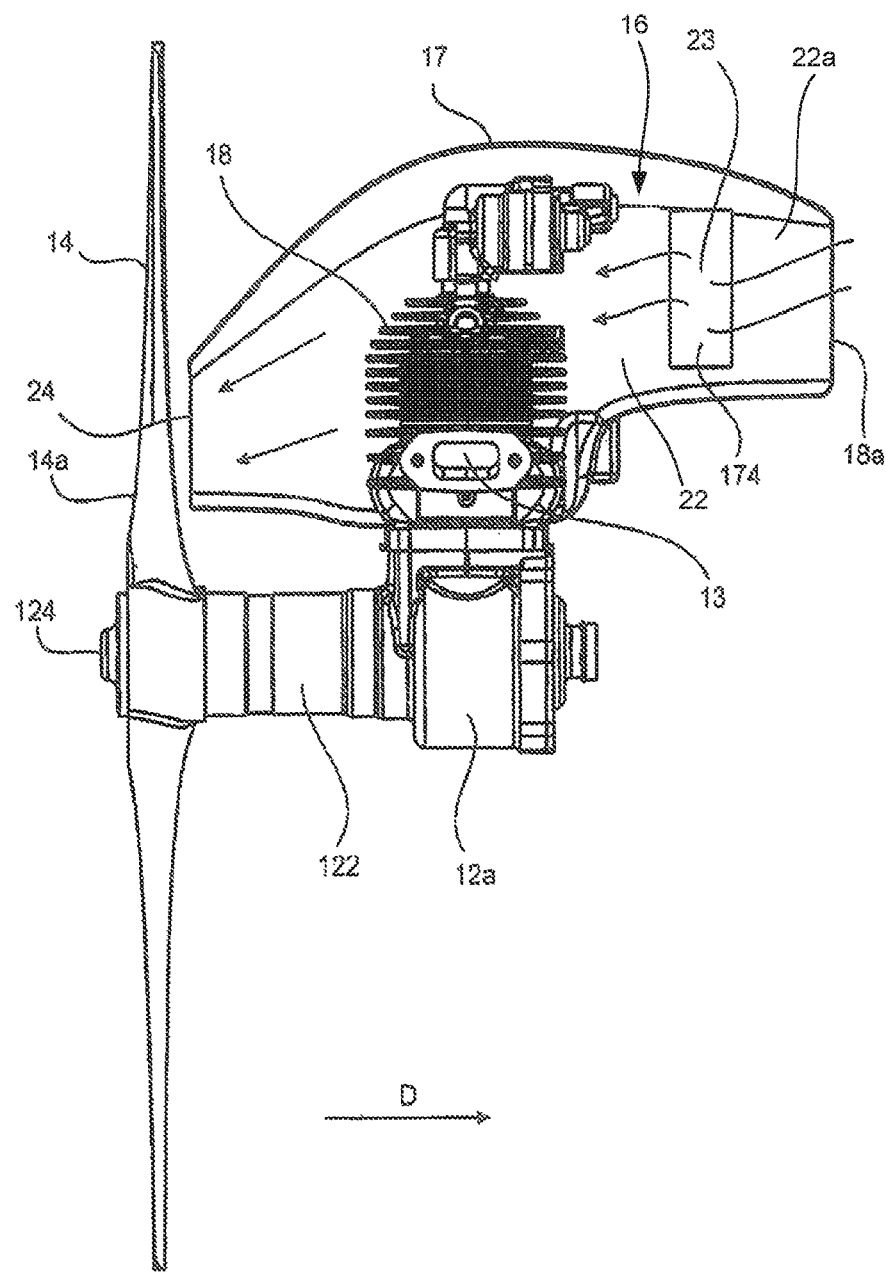
Figure 7:
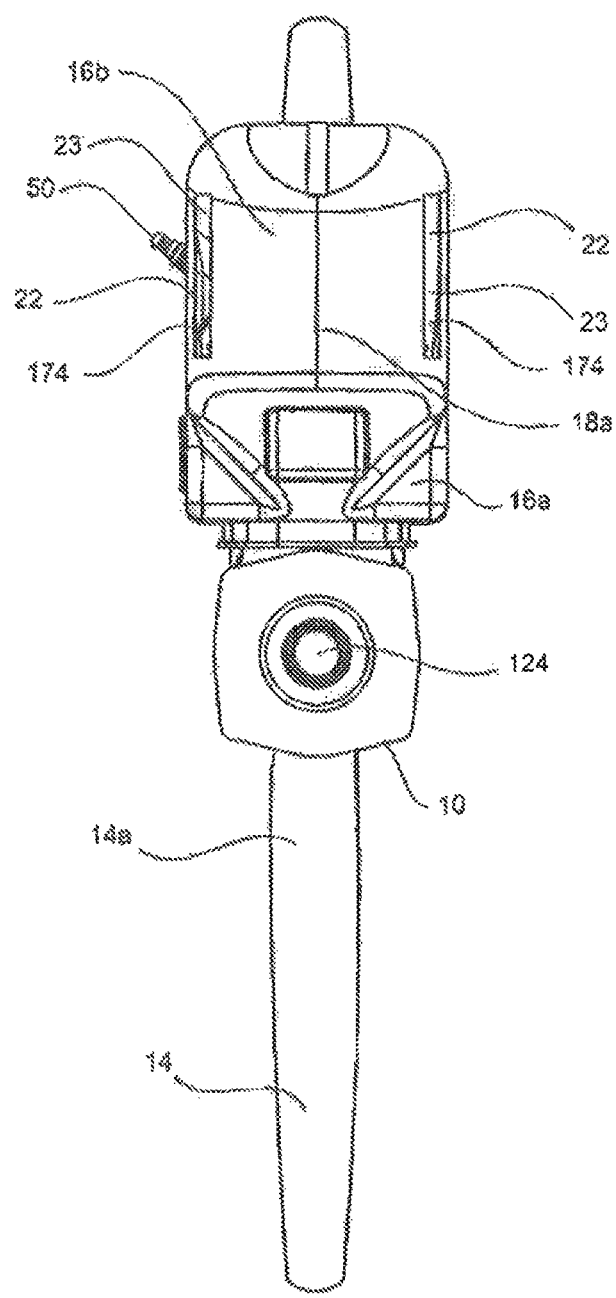
FIG. 7 is a rear view of the pusher prop assembly and associated engine of FIGS. 5 and 6.
Figure 8:
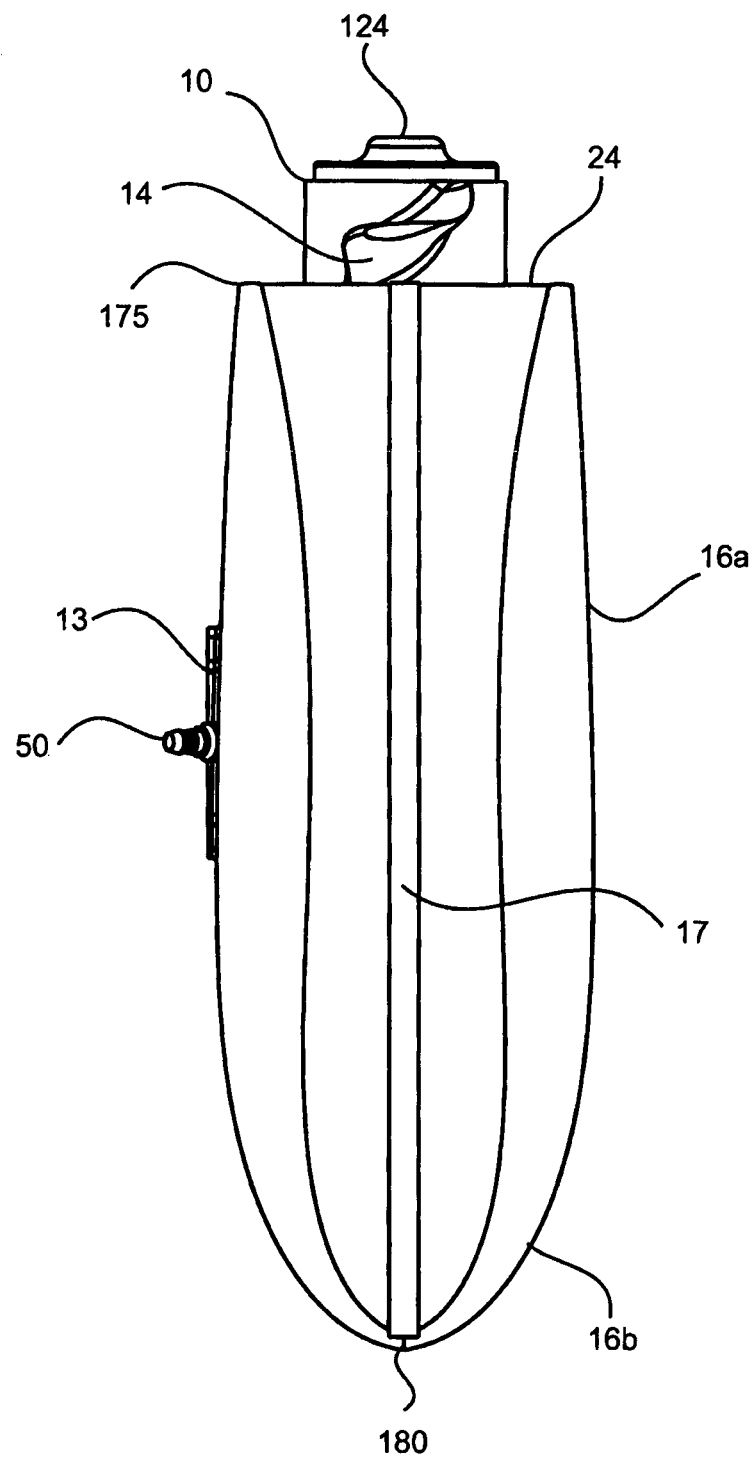
FIG. 8 is a top view of the pusher prop assembly and associated engine of FIGS. 1 to 3.

FIG. 2b shows a cutaway view of the arrangement shown in FIGS. 1 and 2a. An injector and fuel rail arrangement 15 is mounted on top of the cylinder head 18. Cooling airflow through the cowl is represented by the arrows right to left. Depending on airspeed of the UAV, such cooling airflow arises either due to the propeller drawing air through the cowling or due to forward motion of the UAV, or a combination of both. It will be appreciated that airflow through the cowl at zero or very low UAV airspeeds will be predominantly due to the propeller drawing air through the cowling. At higher UAV airspeeds airflow through the cowling will predominantly arise due to forward motion of the UAV.

During operation of prop 14, even if the UAV air speed is zero as at prior to launch when engine 12 is running, air is caused to flow through the aperture 164 and through the air inlet 23 of the cooling air duct 22. The air inlet 23 faces in the same direction as the front face aperture 164 of the engine cowl 16 but, while also of generally polygonal shape, it has significantly less cross-sectional area, increasing air velocity through the cooling air duct 22 as opposed to air velocity through the aperture 164. The cross-sectional area of air inlet 23 is selected to achieve desired air flow rate and velocity through the cooling air duct 22 and ultimately the cylinder head cooling duct portion 42 for cooling cylinder head 18 before air heated by engine 12 in the cooling operation is exhausted through air outlet 24.

Supply of cooling air through the front face aperture 164 of the engine cowl 16 is convenient. However, in a condition where there is air speed, but reduced prop load, such as during descent of the UAV, airflow through the front face aperture 164 and cooling air duct 22 may be sufficient to cause overcooling of the engine 12 when the UAV is operating in certain specific environments.

Alternatively, and in an arrangement—as shown in FIGS. 5 to 8—which reduces overcooling risk, both side walls 17 of the engine cowl 16 are provided with an aperture 174 for supplying air to the cooling air duct 22. No air inlet 23 is provided at a front face of the engine cowl 16 in this case. Indeed, the side walls 17 of the engine cowl 16 converge, curving towards each other to join at its front 180. This has the advantage of forming a further optimized aerodynamic and streamlined shape for the engine cowl 16 minimising disruption of airflow to prop 14. FIG. 6b shows a cutaway view of the arrangement shown in FIGS. 5 and 6a.

The side wall apertures 174 of the engine cowl 16 provide sufficient air supply for the air cooling system and have another significant benefit. The side wall aperture 174 location, extending in direction of airflow towards prop 14, presents lesser cross-sectional or flow area in a direction towards the front of the UAV, reduces air speed induced air intake into the air cooling system and sensitivity to air speed and so there will typically be less risk of engine 12 overcooling.

Side wall apertures 174 open into the plenum portion 16b of the engine cowl 16. The side wall apertures 174 again allow air supply to a cooling air duct 22 extending through, and having air inlet 23 located within, the plenum portion 16b. The air inlet 23 opens in a direction perpendicular to the direction in which a side air aperture 174 of the engine cowl 16 faces. The opening of air inlet 23 is in line with a rearward edge 175 of a side aperture 174. Thus, air is caused to change direction, effectively at right angles from its direction of entry through side aperture 174 before being admitted to the air cooling duct 22. This effective baffling of air inlet 23 results in sufficient though reduced air flow and velocity into the air cooling duct 22 in comparison with the front face option described above, and less risk of engine 12 overcooling.

Number, shape, configuration, flow area and actual location of the side apertures 174 of the engine cowl 16 may be further selected or tuned to minimize risks of engine 12 overheating and overcooling.

The air cooling system may be used to reduce overheating prior to launch, even when the engine 12 with prop 14 running at full engine speed and load. At the same time, the air cooling system may be designed to minimize risk of overcooling, for example on descent of a UAV. The air supply system is also beneficially used for engine cooling at other times during UAV operation.

At the same time, the above described air cooling system may provide noise attenuation benefits, reduction of UAV operating noise being an important object in many cases.

Modifications and variations to the air supply system of the present invention may be apparent to skilled readers of this disclosure. Such modifications and variations fall within the scope of the present invention. For example, while the air supply system has been described with reference to air used for cooling the UAV engine, cooling air could be used for other purposes. For example, air could be supplied for cooling of electronic equipment on board the UAV. Furthermore, while the air supply system has been described with reference to a pusher prop assembly, the air supply system could be arranged for operation with a tractor prop or other prop arrangement with the air inlet and air outlet suitably located to enable air to be drawn through the cooling air duct.

The invention claimed is:

1. An air cooling system for an unmanned aerial vehicle (UAV) that operates without a person occupying the UAV, including a propeller driven by an air cooled engine, said air cooling system comprising:

an engine cooling cowl that at least partially encloses the air cooled engine, the engine cooling cowl including a plurality of side walls which in part define at least one cooling air duct for directing cooling air to the air cooled engine, the engine cooling cowl defining at least one side wall inlet aperture providing the cooling air to the cooling air duct, the engine cooling cowl defining at least one air outlet for the passage of the cooling air after the cooling air has passed over the air cooled engine, wherein the at least one air outlet of the cooling air duct is between the at least one side wall inlet aperture and the propeller, wherein operation of said propeller causes a pressure differential which draws air through the cooling air duct and across the air cooled engine.

2. The air cooling system of claim 1, wherein said cooling air duct is forward of the propeller relative to a front of the UAV.

3. The air cooling system of claim 1 wherein the engine cooling cowl includes one or more apertures for intake and exhaust of air for the air cooling system.

4. The air cooling system of claim 1, wherein the engine cooling cowl extends in a direction from the propeller towards a front of the UAV and wherein the plurality of side walls are connected by an upper surface.

5. The air cooling system of claim 1, wherein the cooling air duct includes a first cooling air duct portion extending through a plenum portion of said engine cooling cowl for supplying the cooling air for circulation around a cylinder head of the air cooled engine.

6. The air cooling system of claim 5, wherein said first cooling air duct portion communicates with a cylinder head cooling air duct portion extending between an inner surface of a cylinder head portion of the engine cooling cowl and the cylinder head.

7. The air cooling system of claim 1, wherein said air outlet is adjacent a radially inward part of the propeller.

8. The air cooling system of claim 1, wherein a cylinder head cooling air duct portion of the cooling air duct is arranged to direct air towards a plurality of cooling fins of a cylinder head.

9. The air cooling system of 8 wherein the cooling air duct has a portion closely adjacent to the plurality of cooling fins of the cylinder head and has a cylinder head cooling portion extending outward of, and surrounding the plurality of cooling fins thereby forming a cooling air gallery between an inner surface of the engine cooling cowl and the cylinder head.

10. The air cooling system of claim 1, wherein an air inlet is provided towards a front of the engine cooling cowl and supplied with air through a front aperture formed in a front face of the engine cooling cowl, wherein the cooling air is caused to flow through the front aperture, into a plenum portion of the engine cooling cowl and through to the air inlet of the cooling air duct.

11. The air cooling system of claim 1, wherein the cooling air duct has a first portion extending through the engine cooling cowl proximate to a cylinder head and a second portion configured to direct air towards a plurality of cooling fins of the cylinder head.

12. The air cooling system of claim 1, wherein a front face of the engine cooling cowl does not include an air inlet.

13. The air cooling system of claim 12, wherein the plurality of side walls of the engine cooling cowl converge towards each other to join at the front face of the engine cooling cowl.

14. The air cooling system of claim 1, wherein the at least one side wall air inlet aperture opens to a plenum portion of the engine cooling cowl and allows an air supply to the cooling air duct extending within, and having an air inlet located within, the plenum portion.

15. The air cooling system of claim 1, wherein an air inlet of the cooling air duct opens in a direction perpendicular to a direction in which said at least one side wall air inlet aperture of the engine cooling cowl faces.

16. The air cooling system of claim 1, wherein the air cooled engine is a dual fluid direct injection fueled engine.

17. The air cooling system of claim 1, wherein the air cooling system is the only air cooling system for the air cooled engine.

18. The air cooling system of claim 1, wherein each side wall from the plurality of side walls of said engine cowl includes at least one side wall air inlet aperture.

19. The air cooling system of claim 1, wherein the cooling air duct includes a plurality of air inlets.

* * * * *